United States Patent Office 3,660,515
Patented May 2, 1972

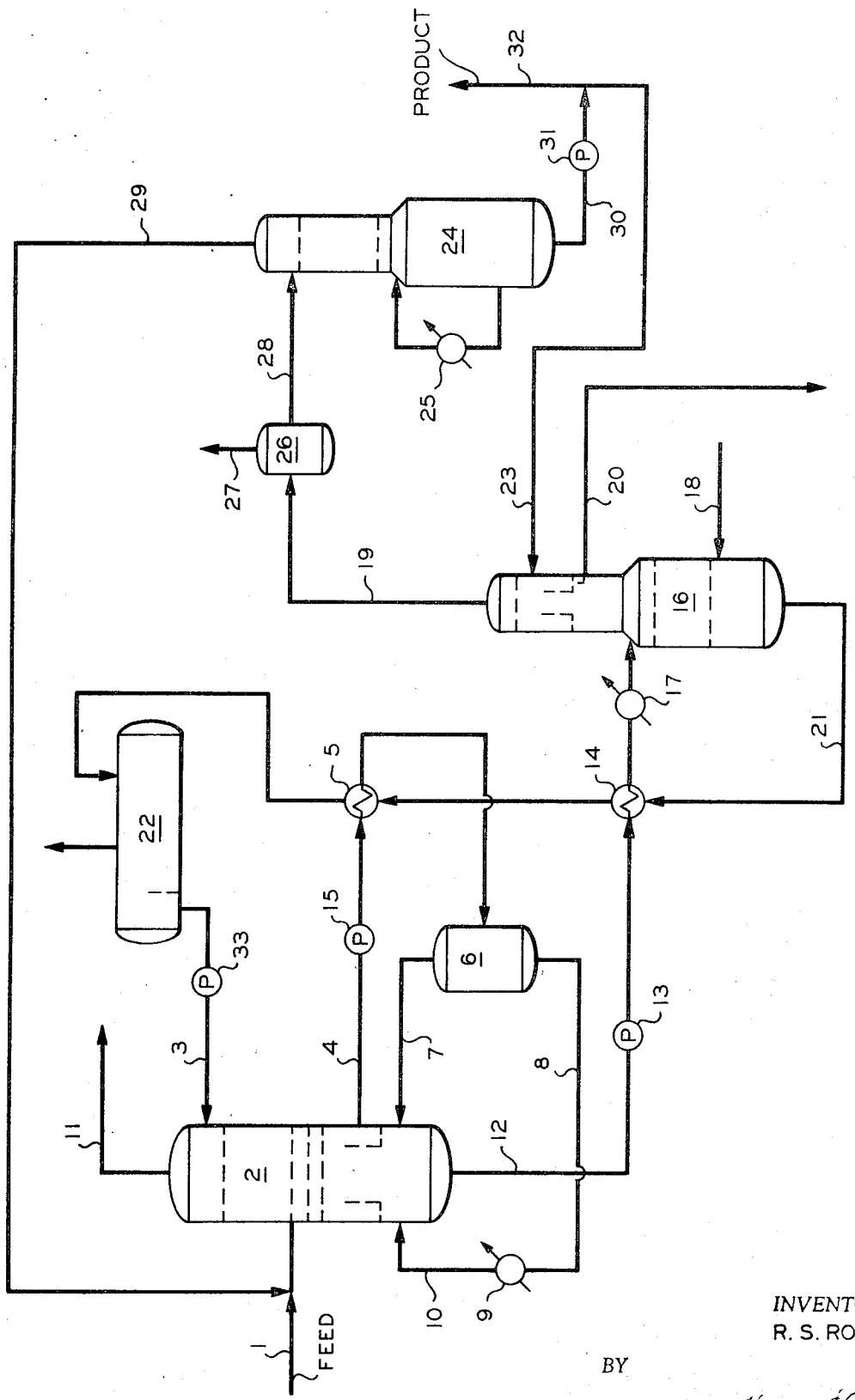

3,660,515
HYDROCARBON PURIFICATION
Ronald S. Rogers, Bartlesville, Okla., assignor to
Phillips Petroleum Company
Filed July 28, 1969, Ser. No. 845,287
Int. Cl. C07c 7/00, 11/16; C10g 21/00
U.S. Cl. 260—681.5 R   10 Claims

ABSTRACT OF THE DISCLOSURE

A method of separating a butene-containing stream of impurities such as oxygen, nitrogen and oxides of carbon by employing an absorption oil in which a portion of the absorption oil is recycled through a flash drum and reintroduced into the absorber, a portion of the impurities being recycled back to the absorber from the final stripper to minimize butane losses.

---

This invention relates to hydrocarbon purification.

In one of its more specific aspects, this invention relates to the removal of noncondensables such as nitrogen, oxygen and oxides of carbon from an olefin-containing stream.

In certain processes there exist low pressure gaseous streams containing small percentages of such noncondensables as nitrogen, oxygen and the oxides of carbon. In order to separate these latter materials from the hydrocarbons, it would seem advantageous to simply compress the hydrocarbon stream to liquefy substantially all of the hydrocarbons and then flash off the noncondensables. However, due to the moisture content of the stream, this method produces a liquid which is corrosive and, in addition, entails certain risks during compression due to the oxygen content of the stream.

The method of this invention avoids those difficulties. According to the method of this invention, there is provided a process for separation of impurities such as oxygen, nitrogen and oxides of carbon from a hydrocarbon stream comprising principally $C_3$ and $C_4$ cuts which comprises contacting the hydrocarbon stream with absorption oil to absorb a principal portion of the hydrocarbons. Some of the impurities pass overhead, but the rich absorption oil is heated, with some of the vapor produced being passed into the absorber and the residual liquid being heated again and introduced into the absorber. The bottoms from the absorber are steam-stripped to separate the absorption oil, the overhead being steam-stripped to produce a $C_3$ and $C_4$ cut substantially devoid of the impurities, and an overhead stream containing principally nitrogen, oxygen and oxides of carbon which is introduced into the absorber.

The method of this invention will be more easily understood when explained in conjunction with the attached drawing showing the schematic flow of one embodiment of the process.

The embodiment illustrated therein was employed for the purpose of purifying a butadiene feedstream containing quantities of nitrogen, oxides of carbon and oxygen. The composition of the feedstream was as follows:

TABLE I

| Composition: | Analysis, weight percent—feed stream |
|---|---|
| $N_2$ | 55 |
| Oxides of carbon | 4 |
| $O_2$ | 5 |
| $C_1$ and $C_2$ | >1 |
| $C_3^+$ | 36 |

Referring now to the drawing, the feedstream, the analysis of which was given above, was charged through conduit 1 to absorber 2. This charge stream was at a temperature of 105° F. and a pressure of about 29 p.s.i.a., preferably not less than 25 p.s.i.a.

Into the top of absorber 2, through conduit 3, was introduced a mineral seal oil absorbent of conventional properties at a rate of about 11.1 pounds of absorbent oil per pound of feedstream. The absorbent oil was introduced at a temperature of about 90° F. Any suitable absorption oil rate can be employed, preferably about 8 to about 12 pounds per pound of feedstream.

Also introduced into absorber 2, in combination with the feedstream was that after-defined overhead stream from oxygen stripper 24 through conduit 29.

Countercurrent contact between the absorbent oil and the feed was made in the absorber which was operated at a bottoms tower temperature of about 250° F. Heat was supplied to the tower by withdrawing a stream from the lowest tray of the tower through conduit 4 by means of pump 15, routing this stream through exchanger 5, and into flash drum 6. The quantity of liquid so circulated was about 8 to about 12 times the amount of the feedstream introduced into absorber 2. In exchanger 5, its temperature was increased from about 140° F. to about 240° F. at which temperatures it was introduced into flash drum 6 which was maintained at a pressure of about 45 p.s.i.a.

From flash drum 6, there was flashed overhead through conduit 7 about 25 to about 35 percent of that material introduced into drum 6, this material being reintroduced into absorber 2 below the bottom tray from which that stream removed from conduit 4 was taken. The balance of the material from drum 6 was introduced through conduit 8 to exchanger 9 where its temperature was increased from about 240° F. to about 255° F., and from there, it was introduced through conduit 10 into absorber 2. The temperature of this stream from exchanger 9 was such as to maintain the oxygen content of the liquid stream leaving the absorber through conduit 12 at less than 10 p.p.m. of butanes by weight.

The overhead stream from absorber 2 was taken through conduit 11 and routed to disposal. The bottoms stream from absorber 2 was taken through conduit 12 for further processing as hereafter described. The analyses of the overhead stream taken from absorber 2 was as follows:

TABLE II

| Composition: | Analysis, weight percent—feed stream |
|---|---|
| $N_2$ | 85.1 |
| Oxides of carbon | 5.2 |
| $O_2$ | 8.3 |
| $C_1^+$ heavier | 1.5 |
| Butadiene | --- |
| Absorption oil | --- |

The bottoms stream from absorber 2 was introduced by means of pump 13 into heat exchanger 14 by means of which its temperature was increased from about 250 to about 310° F. by heat exchange with the after-defined bottoms stream from stripper 16. It was then passed through stream preheater 17 where its temperature was increased to 360° F., after which it was introduced into stripper 16.

Stripper 16 contained sieve trays and operated at a pressure of about 95 p.s.i.a. Superheated stripping stream was introduced into its lower section through conduit 18 at a rate of about 40 pounds per pound of feed. Water was removed from stripper 16 by entrapment on a tray above the point of feed inlet and was withdrawn to disposal through conduit 20. A bottoms stream comprising substantially absorption oil was withdrawn from the bottom of the stripper at about 360° F., routed through conduit 21, cooled with the bottoms stream from absorber 2 in heat exchanger 14 to about 300° F. and cooled to 200° F. by heat exchange with the side-drawoff stream from pump 15 in exchanger 5, and then routed to storage tank 22.

There was introduced into stripper 16 through conduit 23, above the absorption oil trap tray, an after-defined stream from the bottom of oxygen stripper 24.

The overhead stream from stripper 16 taken through conduit 19 contained less than about 250 p.p.m. total of nitrogen and oxides of carbon and contained essentially no oxygen.

Overhead stream through conduit 19 from stripper 16 was partially condensed in condenser 26 where its temperature was reduced to about 100° F. Vapors were removed from condenser 26 through conduit 27, these vapors containing nitrogen and oxides of carbon to the extent of about 3 percent. The condensate from condenser 26, reduced to about 135 p.p.m. total nitrogen and oxides of carbon, was introduced through conduit 28 into oxygen stripper 24 above its top tray.

The bottom of oxygen stripper 24 was maintained at about 130° F. and 70 p.s.i.a. Steam-heated stripper-reboiler 25 provided heat to it.

Through conduit 29 there was taken an overhead stream and through conduits 30 and 32 there was taken the purified product which was free of nitrogen, oxygen and oxides of carbon.

Of the bottoms product removed from the oxygen stripper 24 through conduit 30, about 75 percent was routed to subsequent processing by means of pump 31 through product line 32, the balance being introduced as reflux to stripper 16 through conduit 23. Absorption oil was recycled from storage tank 22 to absorber 2 through conduit 3 by means of pump 33.

The overhead stream from stripper 24 taken through conduit 29 contained about 3 percent total nitrogen, oxygen and oxides of carbon, about 2 percent propanes, and 95 percent $C_4$'s and heavier of which about 70 percent was butadiene. In order to recover these latter materials, this stream was introduced into conduit 1 and thence into absorber 2.

It will be evident that the above process can be implemented by various instrumentation which facilitates the operation of the system. One of the principal instruments in the system and one which contributes appreciably to its successful operation is an analyzer-controller sensing the concentration of the oxygen in the overhead vapor stream taken from flash drum 6 through conduit 7 which, in turn, controls the temperature increase imparted to the liquid reintroduced into absorber 2 through conduit 10 from exchanger 9 by controlling the steam flow rate through exchanger 9.

Alternately, the temperature of the stream reintroduced into absorber 2 through conduit 10 from exchanger 9 can be regulated in the same manner, so as to maintain the oxygen content of that stream withdrawn from absorber 2 through conduit 12 at less than 10 p.p.m. of $C_4$'s by weight.

It will be evident that various modifications can be made to the method of this invention as described. However, such are considered as being within the scope of the invention.

What is claimed is:

1. A method of separating contaminants comprising oxygen, nitrogen and oxides of carbon from a hydrocarbon stream comprising $C_4$ hydrocarbons which comprises:
    (a) contacting said hydrocarbon stream with an absorbent in a first zone and separating a first overhead stream comprising contaminants and a minor amount of hydrocarbons and separating an absorbate containing a major portion of hydrocarbons comprising $C_4$ hydrocarbons and a minor portion of contaminants;
    (b) supplying heat to the first zone by heating a withdrawn portion of said absorbate to produce a liquid and a gaseous stream, and introducing said streams into said first zone and into contact with said absorbent;
    (c) stripping absorbate separated in step (a) from said first zone in a stripping zone and separating a second overhead stream comprising hydrocarbons and contaminants and separating an absorbent stream;
    (d) introducing said absorbent stream into said first zone;
    (e) partially condensing and then heating said second overhead stream and separating a third overhead stream comprising said contaminants and separating a hydrocarbon stream substantially free of said contaminants;
    (f) recovering said hydrocarbon stream; and
    (g) recovering a stream comprising said contaminants and a minor amount of said hydrocarbon from said first zone.

2. The method of claim 1 in which the portion of said absorbate which is heated is an amount within the range of from about 8 to about 12 times the quantity of said hydrocarbon stream introduced into said first zone.

3. The method of claim 2 in which the quantity of gaseous stream produced upon heating said portion of absorbate is within the range of about 25 to about 35 percent of absorbate.

4. The method of claim 3 in which said liquid produced upon said heating of said withdrawn portion of absorbate is further heated before said introduction into said first zone.

5. The method of claim 4 in which said liquid is further heated to a temperature sufficient to maintain the oxygen content of said absorbate from said first zone at less than 10 p.p.m. of said $C_4$ hydrocarbons in said absorbate.

6. The method of claim 1 in which a portion of said recovered hydrocarbon stream is introduced as reflux into said stripping zone.

7. The method of claim 1 in which said second overhead stream from said stripping zone is partially condensed to form a condensate prior to said heating of said second overhead stream, and a portion of said contaminants is separated from said condensate.

8. The method of claim 1 in which said third overhead stream is introduced into said first zone.

9. The method of claim 5 in which a portion of said recovered hydrocarbon stream is introduced as reflux into said stripping zone and said third overhead stream is introduced into said first zone and said second overhead stream from said stripping zone is partially condensed to form a condensate prior to said heating of said second overhead stream, and a portion of said contaminants is separated from said condensate.

10. The process of claim 9 in which said absorbent is contacted with said hydrocarbon stream in an amount within the range of about 8 to about 12 pounds per pound of said hydrocarbon stream, said absorbate comprising a mineral seal oil and said third overhead stream contains hydrocarbons in an amount of about 97 percent.

References Cited

UNITED STATES PATENTS 3,436,436    4/1969    Tkao et al. _____ 260—681.5

DELBERT E. GANTZ, Primary Examiner

G. E. SCHMITKONS, Assistant Examiner

U.S. Cl. X.R.

203—75; 208—103, 317